United States Patent
Spahr et al.

(10) Patent No.: US 8,936,144 B2
(45) Date of Patent: Jan. 20, 2015

(54) HUB WITH A TOOTHED DISK FREEWHEEL

(75) Inventors: Stefan Spahr, Lengnau (CH); Martin Walthert, Aarberg (CH)

(73) Assignee: DT Swiss Inc., Grand Junction, CO (US)

( * ) Notice: Subject to any disclaimer, the term of this patent is extended or adjusted under 35 U.S.C. 154(b) by 0 days.

(21) Appl. No.: 13/585,314

(22) Filed: Aug. 14, 2012

(65) Prior Publication Data

US 2013/0105266 A1 May 2, 2013

(30) Foreign Application Priority Data

Aug. 16, 2011 (DE) .......................... 10 2011 110 199

(51) Int. Cl.
*F16D 41/36* (2006.01)
*F16D 41/24* (2006.01)
*B60B 27/02* (2006.01)

(52) U.S. Cl.
CPC .............. *F16D 41/24* (2013.01); *B60B 27/023* (2013.01); *F16D 41/36* (2013.01); *B60B 2900/321* (2013.01)
USPC .......... 192/64; 192/46; 192/69.81; 192/89.27

(58) Field of Classification Search
CPC ........ F16D 41/36; F16D 41/32; B60B 27/047
USPC ...................................... 192/64, 68.91, 89.27
See application file for complete search history.

(56) References Cited

U.S. PATENT DOCUMENTS

| 5,485,905 | A | 1/1996 | Rader, III | |
| 5,964,332 | A | 10/1999 | King | |
| 6,065,580 | A * | 5/2000 | Kirk | 192/217.3 |
| 6,123,179 | A * | 9/2000 | Chen | 192/64 |
| 6,478,128 | B2 * | 11/2002 | Taylor | 192/64 |
| 6,588,564 | B1 | 7/2003 | Jaeger et al. | |
| 7,175,011 | B2 | 2/2007 | Koehler et al. | |
| 7,191,884 | B2 * | 3/2007 | Kanehisa et al. | 192/64 |
| 7,562,755 | B2 | 7/2009 | Spahr | |
| 2012/0032498 | A1 * | 2/2012 | Klieber | 301/55 |

FOREIGN PATENT DOCUMENTS

| DE | 29 803 667 | 6/1998 |
| DE | 10 2004 004 961 | 8/2005 |
| DE | 10 2009 010 258 | 9/2010 |
| DE | 10 2010 033 272 | 2/2012 |
| DE | 10 2010 033 454 | 2/2012 |

* cited by examiner

*Primary Examiner* — Richard M. Lorence
(74) *Attorney, Agent, or Firm* — Greer, Burns & Crain, Ltd.

(57) ABSTRACT

Hub for two-wheeled vehicles having a hub axle and a hub body and a rotor and with a toothed disk freewheel comprising a pair of interacting engagement components each comprising one axial toothing. The engagement components are biased in the engagement position via a biasing device. The one of the engagement components is received at the hub body to be non-rotatable and axially displaceable and the other of the engagement components is provided non-rotatable at the rotor for transmitting a rotary motion from the rotor to the hub body in the engagement position of the two engagement components. At least one engagement component is configured as a toothed disk and is provided with the axial toothing and has an axial width which is at least the size of half the outer radius of the axial toothing.

10 Claims, 4 Drawing Sheets

HUB WITH A TOOTHED DISK FREEWHEEL

Figure 1:
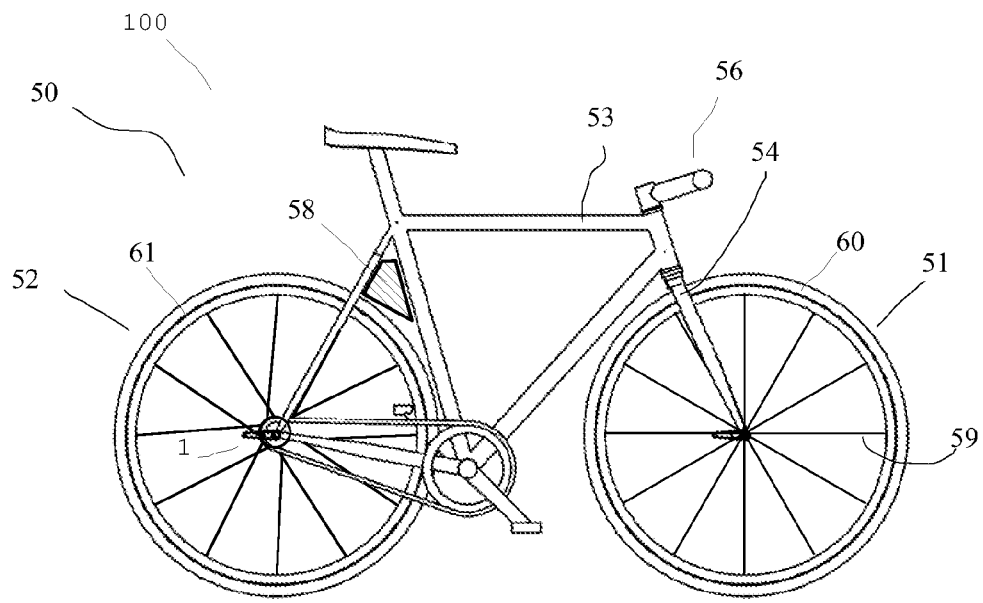

The present invention relates to a hub for at least partially muscle-powered vehicles and in particular two-wheeled vehicles having a hub axle, a hub body, a rotor, and a toothed disk freewheel. A plurality of sprockets may be disposed at the hub rotor to allow many different transmission ratios. This enables an optimal riding style e.g. in steep uphill or downhill rides. Due to the freewheel the rider can let the vehicle roll without pedaling.

Hubs for bicycles are exposed to high and highest loads in particular in the field of sports and in semi-professional and also professional uses. A general problem with the freewheels of bicycle hubs is to ensure the function with a wide variety of rotational speeds. Proper functioning must be ensured both in very low speeds and in very high speeds.

Furthermore the freewheel of a bicycle hub must be able to reliably transmit rotational forces as high as those occurring in sports cars. The surface pressures occurring in bicycles may even be higher still since smaller dimensions are involved.

When applying driving force the freewheel must very quickly and reliably establish force closure while on the other hand the freewheel is expected to only show minor friction in back-pedaling or non-pedaling. When riding uphill or e.g. when high acceleration is involved, high dynamic loads act on the hub such that each of the components of the hub and the hub on the whole must be regarded in terms of dynamics. For example in the case of high loads the axle will bend even if the axle is configured as rigid as possible by means of structural measures and the materials employed.

In the prior art different freewheels have been disclosed. A rear wheel hub offering ease of handling in mounting and maintenance has become known in DE 198 47 673 A1. In this hub, torque is transmitted through a pair of toothed disks provided with axial, meshing toothing at their adjacent side faces. The torque applied is reliably transmitted in the driving direction while in the opposite rotational direction the toothed disks axially diverge from one another, thus allowing freewheeling.

Document DE 10 2004 004 961 B4 likewise discloses a hub having a toothed disk freewheel wherein for increasing rigidity the hub axle is markedly thickened in the region of the freewheel bearing. Due to thickening such a hub has a higher weight and requires more complicated manufacturing. Moreover, even the thickening of the hub axle does not always reliably prevent the freewheel from slipping through.

With DE 10 2007 030 190 A1 a further development of the hub according to DE 198 47 673 A1 has become known which is provided with a toothed disk freewheel, the toothed disks having an L- or U-shaped cross-section. This allows to reduce the comparably high weight of the toothed disks and thus the total weight of the hub.

The indicated prior art per se works reliably. There are tendencies to increase the outer diameters for reasons of weight and stability. Furthermore there are general attempts to further save weight. Tests with other outer dimensions, however, showed decreased reliability.

It is therefore the object of the present invention to provide a hub which allows a still more reliable operation.

This object is solved by a hub according to the invention having the features of claims 1 and 2. Preferred specific embodiments of the invention are the subjects of the subclaims. Further advantages and features of the present invention can be taken from the general description and the description of the exemplary embodiments.

The hub according to the invention according to claim 1 is provided for at least partially muscle-powered vehicles and in particular two-wheeled vehicles, comprising a hub axle, a hub body and a rotor, and a toothed disk freewheel. The toothed disk freewheel comprises a pair of interacting engagement components each having at least one axial toothing. The engagement components are biased in the engagement position via at least one biasing device. One of the engagement components is coupled with the hub body non-rotatable at least in the driving direction and axially displaceable. The other of the engagement components is provided non-rotatably at the rotor for transmitting a rotary motion from the rotor to the hub body in the engagement position of the two engagement components. At least one of the two engagement components is configured as a toothed disk and provided with the axial toothing. The toothed disk has an axial width at least as large as half the outer radius of the axial toothing.

The hub according to the invention according to claim 1 has many advantages. A considerable advantage consists in the structural linking of the outer radius of the axial toothing with the axial width of the toothed disk. The fact that the axial width of the toothed disk is at least half the half outer radius of the axial toothing, i.e. corresponds to at least one fourth of the outer diameter of the axial toothing, ensures a secure axial guiding of the toothed disk in the hub body.

The toothed disk which in the driving direction is non-rotatably coupled with the hub body and is in particular indirectly or directly received or disposed at or in the hub body is provided axially displaceable. The fact that the axial width of the toothed disk is linked with the outer radius of the axial toothing allows to ensure a reliable function of the hub by means of the structure. Surprisingly it has been shown that from approximately an axial width corresponding to half the outer radius of the axial toothing, the hub shows a particularly reliable function. As has been found in intense tests and studies, toothed disks having a narrow axial width may show side tilts in operation such that the toothed disk does not operate as intended.

A hub according to the invention according to claim 2 is again provided for partially muscle-powered vehicles and in particular for two-wheeled vehicles and equipped with a hub axle and a hub body and a rotor as well as a toothed disk freewheel. The toothed disk freewheel comprises a pair of interacting engagement components each having at least one axial toothing. The engagement components are biased in the engagement position via at least one biasing device. One of the engagement components is coupled with the hub body or received at the hub body non-rotatably and axially displaceably at least in the driving direction. The other of the engagement components is provided non-rotatably at the rotor for transmitting a rotary motion from the rotor to the hub body in the engagement position of the engagement components. At least one of the two engagement components is configured as a toothed disk with the axial toothing and has an axial width of more than 6.5 mm.

A hub according to the invention according to claim 2 has many advantages since the hub allows a reliable function. An axial width of more than 6.5 mm results in still more secure operation and reliable function. It has been found that, given the dimensions present in bicycle hubs, an axial width of 6.5 mm results in reliable operation even in the case of increased outer diameters. What is decisive is not only the ratio of the outer diameter to the axial width but also the absolute dimensions, in particular if typical dimensions of a bicycle hub are reached or exceeded.

In preferred specific embodiments the axial width of the toothed disk is 6.7 mm and in particular 6.9 mm. Depending on the configuration of the hub and the materials used, an axial width of 7 mm or even 7.5 mm or more is useful and advantageous. Thus the hub can be optimized wherein while preserving highest operational safety a low weight is achieved and good responsivity can be set.

It is a considerable advantage of all of the hubs according to the invention that such a hub will operate reliably even with highly dynamic loads. Given highly fluctuating loads, the freewheel is subjected to extreme demands for securely transmitting the torque applied at all times. To this end the freewheel must show very quick responses to different requirements. This is ensured by way of a construction according to the invention. A reliable freewheeling function is ensured even when the pressure forces of the biasing device are not particularly high. Furthermore the freewheel allows a highly dynamic freewheeling operation of a hub according to the invention.

It has also been found that in continuous operation involving high loads a narrow-width toothed disk can press into the engagement component receiving the toothed disk since the acting surface pressures may become enormous. The toothed disk received in a radial internal toothing of the engagement component for example by means of a radial external toothing transmits the driving torque to the engagement component or receives its transmission from the engagement component.

The surface pressures acting between the engagement component and the toothed disk require high-strength materials to avoid damage to the contact surfaces. Given too narrow widths of the toothed disk, overload may still occur leading to local unevennesses of the contact surfaces. This in turn impedes the axial movability of the toothed disk relative to the engagement component which leads to reduced dynamic responsivity or even malfunction. By means of a hub according to the invention the acting surface pressure is reduced. In this way the service life is increased and one may use materials showing lower strength which reduces the manufacturing costs.

The hub according to the invention ensures functionality since axial displaceability of the toothed disk relative to the engagement component is ensured involving low friction and low resistance. Thus, in conjunction with the low weight of the toothed disk a highly dynamic function can be ensured which is significant since a slipping-through freewheel involves a considerable risk potential.

Moreover in the case of high loads for example the axle will bend. The bending of the axle causes a tilt to the operating position which a hub according to the invention can securely and quickly compensate. At the same time a tilting of the toothed disk in the engagement component in the dynamic sequence of movements is avoided.

In operation highly dynamic loads tend to occur which cannot be calculated in advance or planned. For example when during a ride a racing bicycle goes over a bump or a stone on the road this results in brief, high loads which show impacts as far as into the hub. This applies in particular to an inventive hub employed in a mountain bike or the like which passes over stones in downhill rides or which is used for jumps. In the case of kicks that are simultaneous or time-shifted in brief intervals the demands on the hub and the freewheel are extreme. The freewheel of an inventive hub can withstand these highly dynamic loads.

On the whole the conduct of a freewheel hub is very complex. A higher quantity of materials or height or width is not generally useful to meet higher demands. For example if the teeth of the axial toothing are enlarged in the radial direction then this will result in a considerably increased friction in freewheeling operation. Back-pedaling may then lead to the carrying side sagging. Moreover the dynamic efficiency is reduced due to the higher weight.

Preferably one of the two engagement components may be configured as a toothed disk with the axial toothing, having an axial width which is at least twice the size of a radial extension of the teeth of the axial toothing. Preferably the axial width amounts to at least 2.25 times or 2.5 times or even 3 times the radial extension of the teeth of the axial toothing. These specific embodiments are advantageous and allow a reliable operation. It has been found advantageous for the axial width of the toothed disk to be at least twice the size or more than is a radial extension of the teeth of the axial toothing. This is surprising in that the teeth of the axial toothing serve for transmitting the driving torque. A significant aspect of reliability ensues from the axial width of the toothed disk which is independent of the axial toothing. To ensure a perfect transmission of the driving torque and to ensure reliable operation of the toothed disk freewheel it is advantageous for the toothed disk to have an axial width that is correspondingly at least twice the width.

In all the configurations an engagement component is indirectly or directly coupled with the hub body axially displaceable and non-rotatable at least in the driving direction. In particular is this engagement component directly or indirectly received at the hub body. The other of the engagement components is provided non-rotatable at the rotor and it may be indirectly or immediately received at the rotor.

In preferred specific embodiments of all of the configurations described above, double the axial width of the toothed disk is preferably at least the same size as an outer radius of the toothed disk. It is also possible and preferred for double the axial width of the toothed disk to be at least 10% larger than an outer radius of the toothed disk.

These measures allow for example to reduce other tolerances to thus allow a more cost effective structure given equal or increased reliability.

Preferably the ratio of a clear inner diameter of the toothed disk to the axial width of the toothed disk is less than 3. Vice versa, the ratio of the axial width of the toothed disk to the clear inner diameter is preferably higher than one third. This feature again refers to the fact that a larger axial width of the toothed disk is advantageous. For reasons of weight one will basically always chose a relatively large clear inner diameter. Given an inner diameter of for example 19.5 mm the axial width of the toothed disk will then preferably be at least 6.5 mm.

In preferred specific embodiments of all of the configurations a cross-section of the toothed disk is preferably L-shaped. The radial leg is provided with the axial toothing. A toothed disk thus configured substantially consists of a perforated disk which is followed by an annular sleeve. The axial toothing is provided at the perforated disk.

Preferably the toothed disk comprises a non-round outer contour which is non-rotatably and axially displaceably received in a matching non-round inner contour of a hub component. The hub component may for example be configured as a receiving ring which in turn is inserted and in particular screwed into the hub body. Or else it is possible for the receiving ring to be glued into the hub body or fixed therein in some other way. The toothed disk with the non-round outer contour can be directly inserted into a non-round inner contour of the hub body. In this case the hub component corresponds to the hub body.

The arrangement of the toothed disk with a non-round outer contour in a corresponding, non-round inner contour of a hub component allows a simple way of axial displaceability while on the other hand ensuring a non-rotatable arrangement of the components relative to one another.

Preferably the toothed disk comprises a radial toothing. In this configuration the non-round outer contour is configured as a radial toothing. Also preferred is another non-round outer contour which may for example be configured as a polygon.

In all the configurations it is preferred for the biasing device to be at least partially disposed in the interior of the toothed disk. Particularly preferably the biasing device or at least one biasing device is configured as a spring and in particular as a coil spring or an annular spring. Due to a biasing device which is at least partially disposed in the interior of the toothed disk a thus configured toothed disk freewheel requires a narrower axial width on the whole. This is possible although the axial width of the toothed disk is increased. On the whole the total axial width of typical bicycle hubs is predefined and in particular limited since such a hub must fit in standardized components. Since in particular for rear wheel hubs the spoke angle on the rotor side is important, thus, a larger axial width of the toothed disk notwithstanding, an overall narrower or unchanged axial width of the toothed disk freewheel can be achieved.

Advantageously the biasing device presses against the radial leg of the toothed disk in the axial direction for biasing the toothed disk in engagement with the other of the engagement components.

It is possible for an axial toothing of an engagement component to be provided at the rotor as an end toothing. In such a configuration a toothed disk interacts with the end toothing at the rotor for transmitting the driving torque.

Or else it is possible for the other of the engagement components to also be configured as a toothed disk and to be non-rotatably and axially displaceably received in the rotor. Then preferably both the toothed disks are urged toward one another in the axial direction by one biasing device each so as to achieve a floating bearing of the toothed disks.

In all the configurations it is preferred for the outer radius of the axial toothing to be at least 14 mm. Preferably the axial width of the toothed disk is at least 7 mm.

In all the configurations at least one toothed disk consists of steel. The hub body may consist of one or more materials and it may for example be manufactured integrally or else be composed of several—including separate—parts.

Preferably the hub body consists at least in part of at least one lightweight material such as light metal or a fibrous composite material. Or else the hub axle may consist of metal and in particular a light metal and may optionally also be manufactured of a fibrous composite material.

In all the configurations it is possible for the hub axle to comprise a thickening for reinforcement in the region of the rotor and/or at least one axial toothing. Or else an increased diameter of the hub axle in the region of the rotor and/or at least one axial toothing is possible. This may contribute to increased operational safety.

Further advantages and features of the present invention can be taken from the description of exemplary embodiments which will be discussed below with reference to the enclosed figures.

Figure 2:
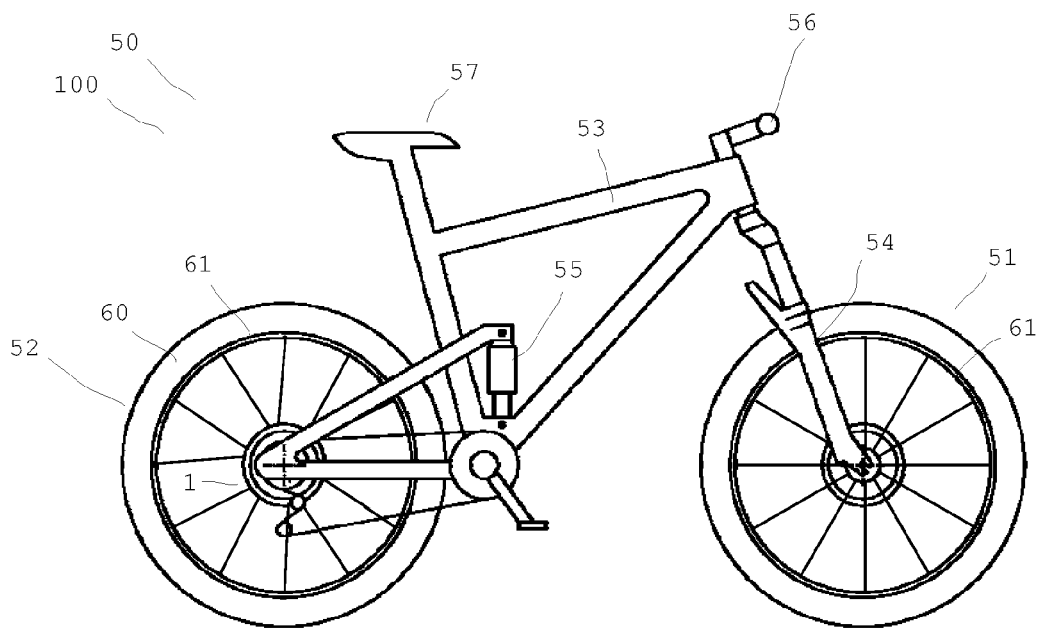
Figure 3:
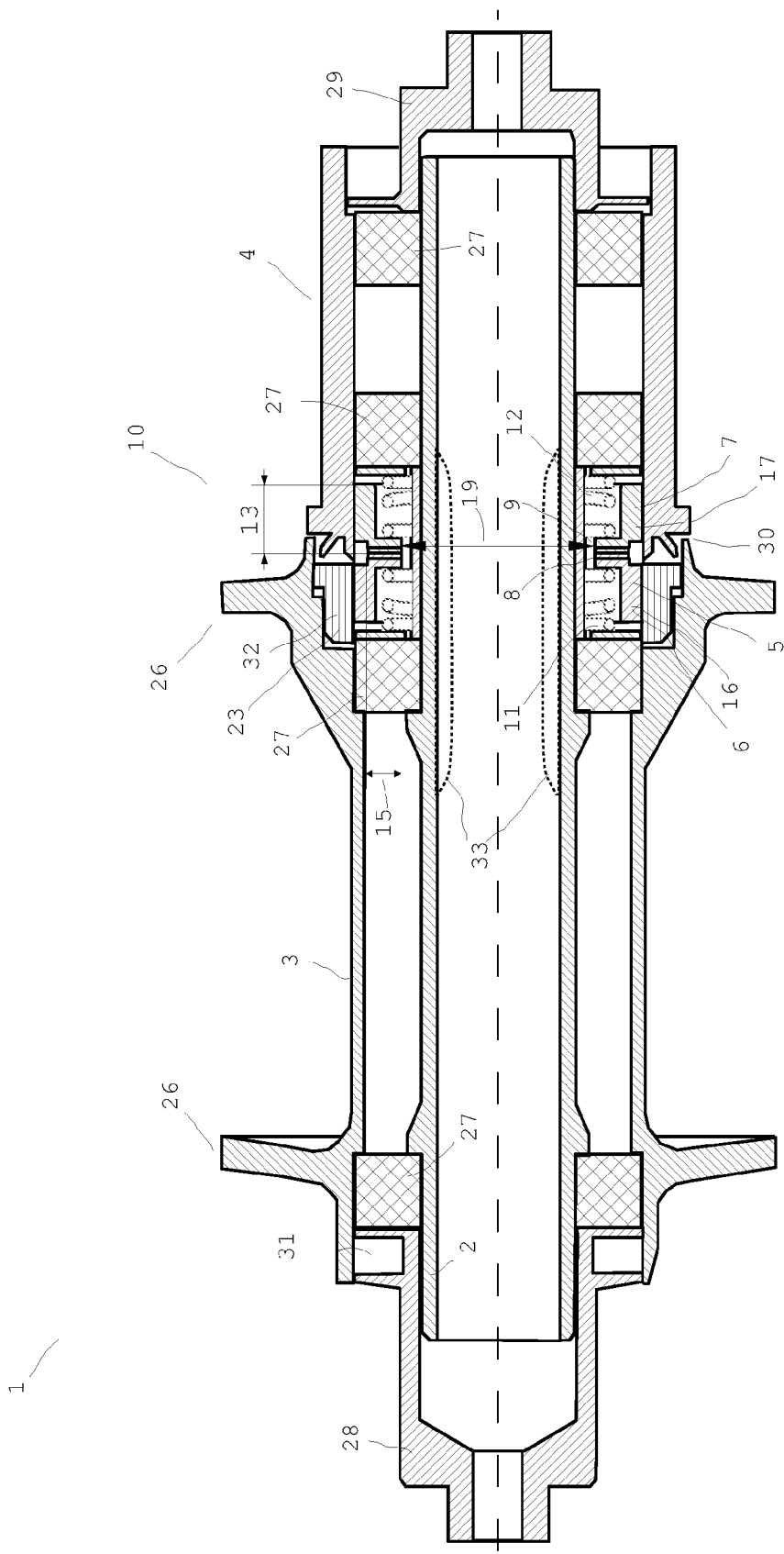
Figure 4:
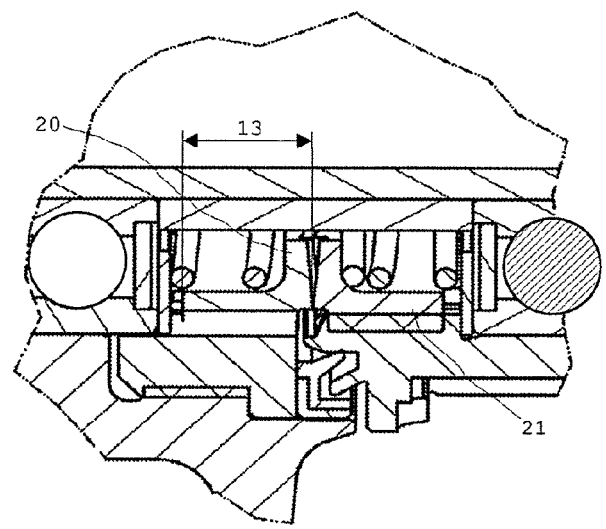
Figure 5:
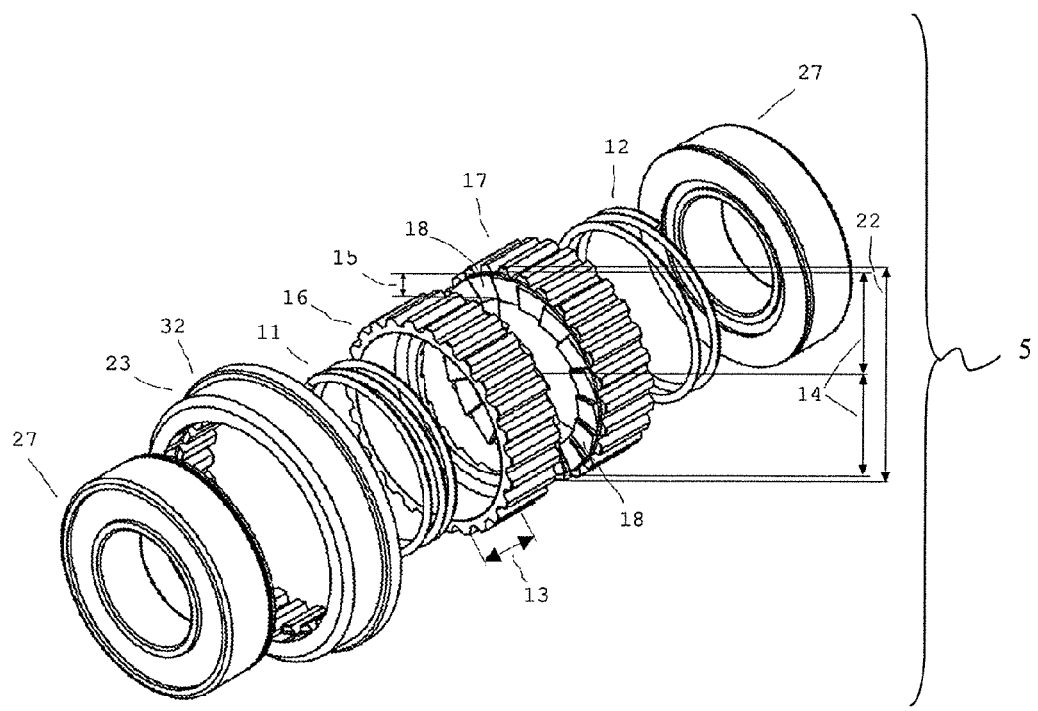
Figure 6:
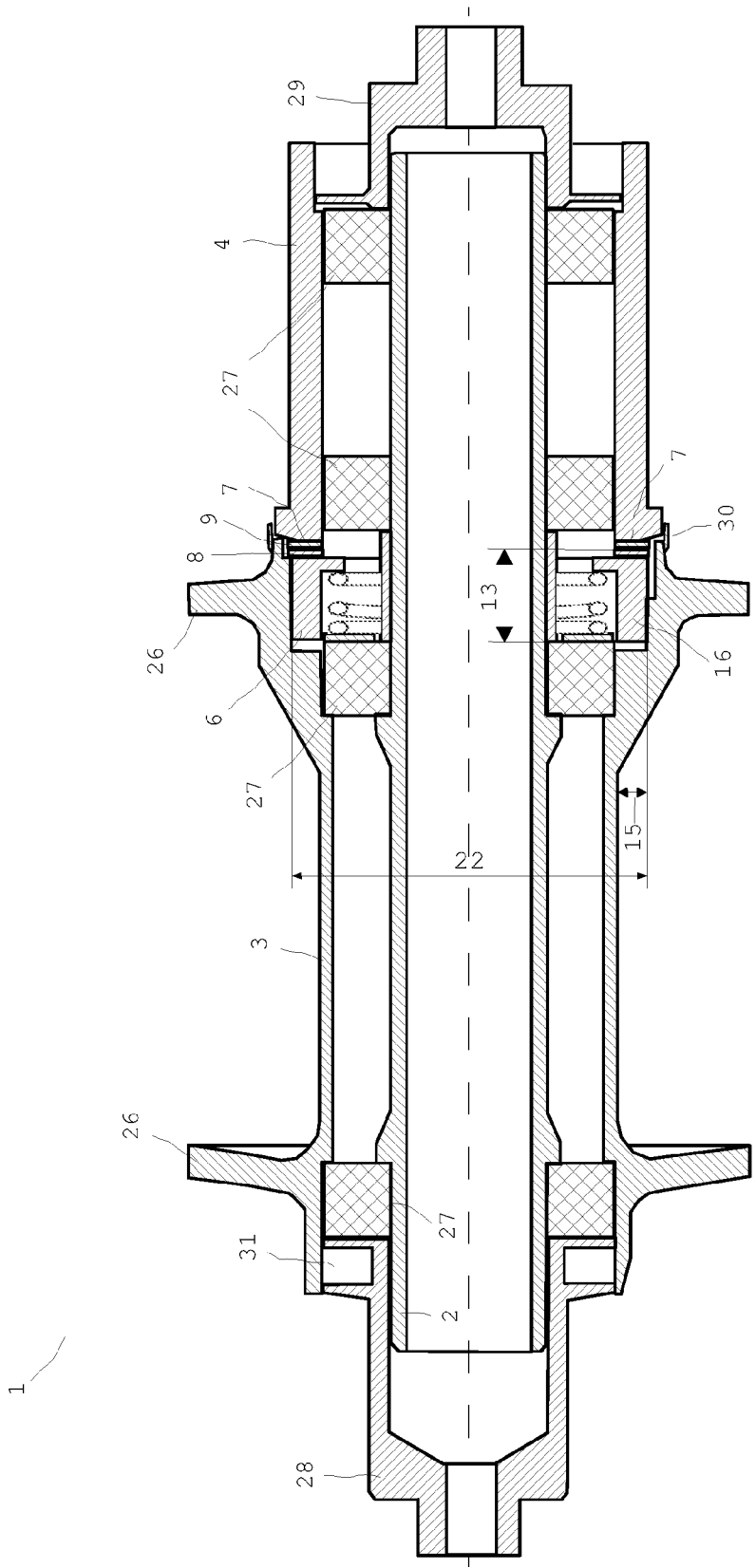

The drawings show in:

FIG. 1 a schematic side view of a racing bicycle equipped with a hub according to the invention;

FIG. 2 a schematic side view of a mountain bike equipped with a hub according to the invention;

FIG. 3 a schematic cross-section of a first hub according to the invention;

FIG. 4 an enlarged detail from FIG. 3;

FIG. 5 an exploded view of the toothed disk freewheel of the hub according to FIG. 3; and FIG. 6 another schematic cross-section of a hub of another exemplary embodiment.

In FIG. 1 a vehicle 100 is illustrated in a schematic side view presently configured as a two-wheeled vehicle 50 and in particular as a racing bicycle. The bicycle 50 is muscle-powered at least in part and may be provided with an electric auxiliary drive.

The racing bicycle is illustrated in a simplistic side view and comprises a front wheel 51, a rear wheel 52 and a frame 53. A handlebar 56 serves as a control and may have different configurations. Apart from a racing handlebar configuration other known configurations are conceivable as well.

Beneath the saddle 57 a battery 58 may be provided which is employed in particular for electro-assisted two-wheeled vehicles. Generally speaking, such a battery 58 may be attached to the frame in other places or incorporated into the frame or received elsewhere.

In the bicycle according to FIG. 1 the tire 60 is configured as a tubeless tire and is for example glued onto the rim 61. The rims 61 of the front wheel 51 and the rear wheel 52 are each connected with the hub via spokes 59.

The rear wheel 52 is provided with a hub 1 according to the invention as the rear wheel hub.

FIG. 2 illustrates a mountainbike as the bicycle 50 in a simplistic side view comprising a front wheel 51, a rear wheel 52, a frame 53, a sprung front fork 54 and a rear wheel damper 55. In this exemplary embodiment, disk brakes are provided. The rear wheel 52 is provided with a hub 1 according to the invention.

FIG. 3 shows a simplistic cross-section of an inventive hub 1 for a bicycle 50 according to FIG. 1 or FIG. 2.

The hub 1 according to the invention is provided with a hub axle 2 presently configured hollow and a hub body 3 presently configured one-piece which comprises two hub flanges 26 for fastening the spokes. In other configurations the hub body may be configured multipart and for example may be provided with a hub sleeve and separate hub flanges 26 fastened thereto.

The rotor 4 serves to receive at least one sprocket and in particular to receive a sprocket cluster having multiple sprockets. Selecting a corresponding sprocket allows to change the driving gear ratio as desired.

A toothed disk freewheel 5 is provided to transmit the torque to the hub body as a driving torque is applied while for example in downhill rides or the like a decoupling of the rotary motions of the hub body 3 and the rotor 4 may occur.

In the illustrated exemplary embodiment the toothed disk freewheel 5 is provided with two engagement components 6 and 7 each provided with an axial toothing 8, 9 which in the engagement position 10 illustrated in FIG. 3 are engaged with one another.

In this exemplary embodiment the two engagement components 6, 7 are each configured as a toothed disk 16 or 17, preferably showing identical structures.

The cross-section of each of the toothed disks is generally about U-shaped, the geometry of the toothed disks 16 and 17 resulting from combining a perforated disk and a sleeve. The axial toothing 8 is provided at the perforated disk.

The engagement component 6 configured as a toothed disk 16 in the present exemplary embodiment is received in the hub component 23 configured as a threaded ring 32 to be axially displaceable and non-rotatable. To this end the toothed disk 16 comprises an external toothing engaging in a corresponding internal toothing of the threaded ring 32 so as to allow axial movement while a rotary motion of the toothed disk 16 relative to the threaded ring 32 is not possible.

In other configurations it is also possible to omit the threaded ring 32 and to provide a corresponding non-round inner contour immediately in the hub body 3. The component 23 could thus be omitted.

On the other hand, however, one advantage of the separate threaded ring 32 is that the threaded ring 32 may be manufactured from a harder and thus most likely heavier material than is the hub body 3 without much increasing the total weight. Moreover the threaded ring 32 can be exchanged in the case of wear or as needed.

In the present exemplary embodiment the threaded ring 32 also serves to axially fix the bearing 27 which on its other side abuts against a shoulder of the hub axle 2. Or else it is possible to fasten the bearing 27 for example via force fit or to fix it by means of other fastening means.

The other of the engagement components 7 in the present exemplary embodiment is configured as a toothed disk 17 and also comprises a non-round outer contour and in particular an external toothing which is disposed in a corresponding internal toothing of the rotor 4 to be non-rotatable but axially displaceable.

Each of the two toothed disks 16, 17 are urged toward one another in the axial direction by means of a biasing device 11 or 12 configured as a coil spring to have the axial toothings 8 and 9 engage with one another. In this way a torque transmission from the rotor 4 to the hub body 3 is enabled in the driving direction while in the reversed rotational direction the teeth of the toothed disks 8, 9 are urged away from one another against the force of the biasing devices 11, 12, gliding past one another on their tooth flanks.

For sealing, a seal 30 is provided between the rotor 4 and the hub body 3 which can presently comprise a contactless labyrinth seal and/or a contacting elastomeric seal to keep moisture and dust and the like away from the toothed disk freewheel 5.

One of the ends is provided with an adapter ring 28 and the other of the ends with an adapter ring 29 which are pushed onto the hub axle 2 and which at their extreme ends comprise regions suitable to be pushed into the dropouts of a bicycle fork or a bicycle frame. A quick release not illustrated in FIG. 3 may for example serve for fastening.

The adapter ring 28 presently comprises a double-flange seal 31 acting as a double labyrinth seal and showing high efficiency. The adapter ring 29 may be configured in analogy.

Two bearings 27 are provided for supporting the rotor.

A clear inner diameter 19 of the toothed disks 16, 17 is not larger than three times the axial width 13 of the toothed disk 16. This ensures a secure seat of the toothed disk 16 in the threaded ring 32 and prevents possible tilting of the toothed disk 16 in moving back and forth. This will further increase the reliability of the toothed disk freewheel. It has been found that the toothed disk 16 operates more reliably with larger axial widths. A larger axial width results in safe operation in particular with large outer diameters.

For reinforcement a radial thickening 33 may be provided as is presently illustrated in dashed lines. The thickening 33 may be configured inwardly at the hub axle 2. It is also possible to provide the thickening 33 radially outwardly.

In the FIGS. 4 and 5 the toothed disk freewheel 5 is illustrated in an enlarged cross-section or in an enlarged, exploded view for better illustration of the details.

FIG. 4 shows that the axial width 13 of the toothed disk 16 is more than twice the size of the radial extension 15 of the teeth 18 of the toothed disks 16 and 17. Surprisingly it has been found that given at least twice the size of the axial width 13 of the toothed disk 16 a still reliable operation of the toothed disk freewheel 5 will ensue.

The radial leg 20 is provided with the teeth 18 of the axial toothings 8, 9. The radial extension 15 is less than half the axial width 13 of the toothed disks 16 or 17.

In particular, as the exploded view according to FIG. 5 shows, the outer radius 14 of the axial toothings 8 and 9 is not larger than double the axial width 13 of the toothed disks 16, 17. Reversely, the axial width 13 of the toothed disks 16, 17 is at least the same size as half the outer radius 14 of the axial toothings 8 and 9. In this way a width ratio is defined which allows particularly reliable axial displacements of the toothed disks 16 or 17 in the rotor 4 or hub body 3. A tilting of the toothed disks in axial displacement is virtually entirely excluded.

Given the typical dimensions of bicycle hubs 1 an axial width 13 of the toothed disks 16 or 17 of 6.5 mm or more has been found advantageous, in particular in the case of toothed disks 16 and 17 being provided with larger outer diameters.

FIG. 6 shows another exemplary embodiment of a hub 1 according to the invention, the structure of which being substantially the same as that of the hub 1 according to the invention according to FIG. 3. Therefore, like or similar parts are provided with the same reference numerals.

The hub 1 in the exemplary embodiment according to FIG. 6 is provided with a hub axle 2 and a hub body 3 equipped with hub flanges 26.

The hub body 3 is rotatably supported relative to the hub axle 2 by means of two bearings 27. The rotor 4 is likewise rotatably supported relative to the hub axle by means of two bearings 27.

Between the hub body 3 and the rotor 4 a toothed disk freewheel 5 is provided which in turn comprises engagement components 6 and 7. A contactless and/or contacting sealing may be provided between the rotor 4 and the hub body 3.

In this exemplary embodiment the engagement components 6 and 7 are configured differently. While the engagement component 6 is configured as a toothed disk 16, the engagement component 7 is configured as an end toothing at one axial end of the rotor 4. In this way the axial end of the rotor 4 with the axial toothing 9 provided thereat is in engagement with the axial toothing 8 of the toothed disk 16.

The toothed disk 16 is biased in the axial direction toward the rotor 4 by a biasing device 11 presently configured as a coil spring such that the teeth 18 of the axial toothings 8 and 9 are as a rule engaged with one another.

In the present exemplary embodiment the bearings 27 provided to support the hub body 3 adjacent to the toothed disk 16 are for example inserted by means of force fit.

Although a threaded ring 32 for receiving the toothed disk 16 is not provided in this exemplary embodiment it may be provided in the hub body 3 in analogy to the exemplary embodiment according to FIG. 3.

Due to the engagement component 7 with the axial toothing 9 being provided as a spur gear 4 at the rotor 4, its outer diameter is larger than in the exemplary embodiment according to FIG. 3. Correspondingly an increased axial width 13 of the toothed disk 16 is provided. The width of the toothed disk 16 is presently at least 6.5 mm and in particular at least one third of the outer diameter of the axial toothing 9 at the rotor 4.

The axial width 13 is again at least twice the size of the radial extension 15 of the teeth 18 of the axial toothings 8 and 9.

On the whole the invention provides an advantageous hub 1 which allows very reliable operation with a toothed disk freewheel even with increased diameters.

| | List of reference numerals: | | |
|---|---|---|---|
| 1 | hub | 4 | rotor |
| 2 | hub axle | 5 | toothed disk freewheel |
| 3 | hub body | 6 | engagement component |
| 7 | engagement components | 28 | adapter ring |
| 8 | axial toothing | 29 | adapter ring |
| 9 | axial toothing | 30 | seal |
| 10 | engagement position | 31 | double flange seal |
| 11 | biasing device | 32 | hub component, threaded ring |
| 12 | biasing device | | |
| 13 | axial width | 33 | thickening |
| 14 | external radius | 50 | bicycle |
| 15 | radial extension | 51 | front wheel |
| 16 | toothed disk | 52 | rear wheel |
| 17 | toothed disk | 53 | frame |
| 18 | tooth | 54 | fork |
| 19 | inner diameter | 55 | rear wheel damper |
| 20 | radial leg | 56 | handlebar |
| 21 | axial leg | 57 | saddle |
| 22 | outer diameter | 58 | battery |
| 23 | hub component | 59 | spoke |
| 24 | hub component | 60 | tire |
| 25 | outer radius | 61 | rim |
| 26 | hub flange | 100 | vehicle |
| 27 | bearing | | |

The invention claimed is:

1. A hub for at least partially muscle-powered vehicles, comprising:
a hub axle, a hub body, a rotor and a toothed disk freewheel comprising a pair of interacting engagement components each comprising at least one axial toothing, the engagement components being biased in an engagement position via two biasing devices;
one of the engagement components is coupled with the hub body to be axially displaceable and non-rotatable in the driving direction;
another of the engagement components is provided non-rotatable at the rotor for transmitting a rotary motion from the rotor to the hub body in the engagement position of the two engagement components; and
the two engagement components are configured as toothed disks and are provided with axial toothing and have an axial width that is at least the same size as half the outer radius of the axial toothing,
a first one of said biasing devices associated with one of said toothed disks and a second one of said biasing devices associated with the other of said toothed disks, the biasing devices are at least partially disposed in an interior of said toothed disks, a cross-section of each of said toothed disks being L-shaped, wherein a radial leg of each of the toothed disks includes the axial toothing, and
wherein said biasing devices each press against the respective radial legs of the toothed disks to urge the toothed disks toward one another in an axial direction so as to achieve a floating bearing of the toothed disks.

2. A hub for at least partially muscle-powered vehicles, comprising:
a hub axle, a hub body, a rotor and a toothed disk freewheel comprising a pair of interacting engagement components each comprising at least one axial toothing the engagement components each being biased in an engagement position via at least one biasing device;
one of the engagement components is coupled with the hub body to be axially displaceable and non-rotatable in the driving direction;
another of the engagement components is provided non-rotatable at the rotor for transmitting a rotary motion from the rotor to the hub body in the engagement position of the two engagement components; and
the two engagement components are configured as toothed disks with the axial toothing and have an axial width of more than 6.5 mm,
a first one of said biasing devices associated with one of said toothed disks and a second one of said biasing devices associated with the other of said toothed disks, the biasing devices are at least partially disposed in an interior of said toothed disks, a cross-section of each of said toothed disks being L-shaped, wherein a radial leg of each of the toothed disks includes the axial toothing, and
wherein said biasing devices each press against the respective radial legs of the toothed disks to urge the toothed disks toward one another in an axial direction so as to achieve a floating bearing of the toothed disks.

3. The hub according to claim 1, wherein the axial width is at least twice the size as is a radial extension of the teeth of the axial toothing.

4. The hub according to claim 1, wherein double an axial width of the toothed disk is at least the same size as an outer radius of the toothed disk.

5. The hub according to claim 1, wherein the ratio of a clear inner diameter of the toothed disk to the axial width of the toothed disk is less than three.

6. The hub according to claim 1, wherein the toothed disk has a non-round outer contour and is received in a corresponding, non-round inner contour of a hub component to be non-rotatable and axially displaceable.

7. The hub according to claim 6, wherein the non-round outer contour of the toothed disk comprises a radial toothing.

8. The hub according to claim 1, wherein the outer radius of the axial toothing is at least 14 mm.

9. The hub according to claim 1, wherein the axial width of the toothed disk is at least 7 mm.

10. The hub according to claim 1, wherein at least one toothed disk consists of steel and the hub body consists at least in part of at least one lightweight material such as light metal or a fibrous composite material.

* * * * *